Patented July 12, 1938

2,123,617

UNITED STATES PATENT OFFICE 2,123,617

PURIFICATION OF METALS

Thomas H. Vaughn, Niagara Falls, N. Y., assignor to Union Carbide and Carbon Research Laboratories, Inc., a corporation of New York No Drawing. Application February 29, 1936, Serial No. 66,437

6 Claims. (Cl. 75—121).

The invention relates to the preparation of pure metals of the alkali and alkaline earth groups, and more particularly to the preparation of such metals in extremely fine comminuted or subdivided form, either dry or in liquid suspension.

Commercially available grades of alkali and alkaline earth metals contain appreciable amounts of impurities such as the oxide and/or chloride of the metal, silica, and compounds of iron. These metals are, moreover, usually available only in lump or mechanically powdered form. Difficulties involved in powdering them makes the cost of such metals in powdered form excessive. There is a considerable demand for pure alkali and alkaline earth metals, and especially for such metals in finely divided form capable of forming liquid suspension, and it is the principal object of the invention to provide means for satisfying this demand.

In the practice of my invention an alkali or alkaline earth metal, for example calcium, is dissolved in liquid ammonia at or below the boiling point of the ammonia. The impurities commonly found in the metal are insoluble in liquid ammonia, and therefore remain as a sludge of solid material which can be filtered off, thus giving a solution of pure metal in ammonia.

From this point the methods of the invention may lead either to the production of pure metal in powdered or compacted form, or to a suspension of pure metallic powder in a suitable inert liquid medium, such as toluene.

As an example of the use of the invention to produce dry comminuted metal, the following actual test is given: One part of commercial calcium metal containing approximately 10% of impurities consisting principally of iron compounds, calcium chloride, and calcium oxide, was dissolved in 20 parts of liquid ammonia. A clear solution, from which some sediment settled, resulted. The liquid was then filtered through a fritted glass filter which retained the sediment (insoluble impurities) and the clear purified solution of calcium in liquid ammonia was evaporated to dryness. The metallic calcium was deposited as a porous cake of metal, found upon analysis to contain 99.67% calcium with only traces of iron and of chlorides.

Another method which has been successfully used for preparation of the ammonia solution is to place the metal to be dissolved on a fritted glass filter, and there subject it to the action of gaseous ammonia at —34° C. and a slight super-atmospheric pressure, for example 790 mm. of mercury. Under such conditions the gaseous ammonia condenses on the surface of the metal, dissolves it, and a clear solution of metal in liquid ammonia drips through into a suitable receptacle. The solution may then be evaporated to dryness as before.

The cake of pure metal thus obtained can of course be pulverized if the metal powder is desired, or it can be compacted by pressure, sintering, or fusion, if the metal is desired in the form of pellets, ingots, or the like.

If a suspension of the metal is desired, it is preferably prepared from the porous metal cake by soaking the cake in the suspending medium, and then agitating the wet cake of metal in contact with the desired volume of suspending medium.

Alternatively, the solution of metal in liquid ammonia may be poured into the required quantity of suspending medium, and the ammonia removed by vaporization at an elevated temperature. If desired, the ammonia may first be mixed with the suspending medium, the metal dissolved in the mixture, and the ammonia removed by vaporization at an elevated temperature.

In a specific instance, such a suspension was prepared by mixing with 10 parts of toluene (by weight) a solution of 1 part of calcium metal in 20 parts of liquid ammonia, and then distilling the ammonia from the resultant mixture. The calcium metal remained as a very finely dispersed permanent suspension in the toluene.

Microscopic examination showed the metal present in particles cubical in shape and smaller than about 10 microns in size. The limit of resolving power of the microscope employed was about 1.5 microns, and it is believed that a considerable portion of the metal particles were present in sizes smaller than 1.5 microns. Since the lower limit of size of alkali and alkaline earth metal powders heretofore available has been on the order of one thousandth of an inch, or 25 microns, and since the dispersive power of solid particles in suspension varies approximately as the inverse cube of the size of the particles, it is evident that even the largest particles of metal powder prepared after the manner of the invention have vastly greater dispersive power than alkali and alkaline earth metal powders hitherto available. For the same reason, it appears that the metal powders of the invention possess much greater chemical activity than similar powders hitherto available.

In the carrying out of the process of the invention certain precautions must be exercised.

The finely divided calcium metal, and the solution of calcium metal in liquid ammonia, are extremely active chemically and must be kept out of contact with oxygen or materials apt to cause contamination. The solution of the metal in liquid ammonia is in general a strongly exothermic process, and it will usually be found desirable to cool the reaction vessel in a refrigerating medium, such as liquid ammonia, a solid carbon dioxide-alcohol bath, or other suitable medium.

If the methods of the invention are used primarily for the preparation of metals in purified form, any insoluble impurities originally contained in the metal may be removed from the ammonia solution by filtering or decantation or the like before proceeding with further treatment. However, if purification is unnecessary it is evident that this step may be omitted without departing from the spirit of the invention.

I claim:

1. Process for treating impure metals of the alkali and alkaline earth groups which comprises dissolving the metal in liquid ammonia, separating the solution thus formed from insoluble impurities, removing the ammonia by evaporation, and pulverizing the porous cake of metal thus obtained.

2. Process for preparing purified metals of the alkali and alkaline earth groups in the form of a finely dispersed suspension which comprises dissolving the metal in liquid ammonia, separating the solution thus formed from insoluble impurities, mixing the purified solution with a liquid suspending medium, and removing the ammonia by distillation.

3. Process for preparing purified metals of the alkali and alkaline earth groups in the form of finely dispersed suspensions which comprises dissolving the metal in liquid ammonia, separating from insoluble impurities the solution so formed, removing the ammonia to form a porous cake of said metal, moistening said cake of metal with a suspending medium, and agitating the moistened cake of metal with the required quantity of suspending medium until dispersion is completed.

4. Process for preparing metals of the alkali and alkaline earth groups in the form of a finely dispersed suspension which comprises dissolving the metal in liquid ammonia, mixing the solution with the liquid suspending medium, and removing the ammonia by distillation.

5. Process for preparing metals of the alkali and alkaline earth groups in the form of finely dispersed suspensions which comprises dissolving the metal in liquid ammonia, evaporating the solution to dryness to form a porous cake of said metal, moistening said cake of metal with a suspending medium, and agitating the moistened cake of metal with the required quantity of suspending medium until dispersion is completed.

6. Process for preparing a finely dispersed suspension of metallic calcium which comprises dissolving metallic calcium in liquid ammonia, mixing the resulting solution with toluene, and removing the ammonia by distillation.

THOMAS H. VAUGHN.